United States Patent
Hou et al.

(10) Patent No.: US 12,337,550 B2
(45) Date of Patent: Jun. 24, 2025

(54) THERMOPLASTIC COMPOSITE MASTER SHEETS AND TAPES AND METHOD

(71) Applicant: WEB INDUSTRIES, INC., Marlborough, MA (US)

(72) Inventors: Grand Hou, Norcross, GA (US); Manish Baldevbhai Patel, Bishop, GA (US); Charouny Chansipaeng-Lee, Cumming, GA (US); Mark L. Richardson, Suwanee, GA (US)

(73) Assignee: WEB INDUSTRIES, INC., Marlborough, MA (US)

( * ) Notice: Subject to any disclaimer, the term of this patent is extended or adjusted under 35 U.S.C. 154(b) by 0 days.

(21) Appl. No.: 18/368,806

(22) Filed: Sep. 15, 2023

(65) Prior Publication Data

US 2024/0001627 A1    Jan. 4, 2024

Related U.S. Application Data

(62) Division of application No. 16/114,141, filed on Aug. 27, 2018, now Pat. No. 11,766,838.
(Continued)

(51) Int. Cl.
*B29C 70/22* (2006.01)
*B29B 11/16* (2006.01)
(Continued)

(52) U.S. Cl.
CPC ............ *B29C 70/228* (2013.01); *B29B 11/16* (2013.01); *B29C 70/086* (2013.01);
(Continued)

(58) Field of Classification Search
CPC ..... B29C 70/086; B29C 70/228; B29C 70/30; B29C 70/035; B29C 70/202; B29C 70/545; B29C 70/50; B29C 2793/0036; B29C 2793/0072; B29C 2793/0081; B32B 27/281; B32B 3/10; B32B 5/02;
(Continued)

(56) References Cited

U.S. PATENT DOCUMENTS

| 4,536,438 A | 8/1985 | Bishop et al. |
| 4,883,700 A | 11/1989 | Harpell et al. |

(Continued)

FOREIGN PATENT DOCUMENTS

| EP | 0319895 A2 | 6/1989 |
| JP | H01-320146 A | 12/1989 |

(Continued)

OTHER PUBLICATIONS

Provisional Opinion Accompanying Partial Search Result and International Search Report and Written Opinion in re> PCT/US2018/048208 which corresponds to the instant pending US patent application. (undated).
(Continued)

*Primary Examiner* — Camie S Thompson
(74) *Attorney, Agent, or Firm* — Hoffmann & Baron, LLP; Edward K. Welch, II

(57) ABSTRACT

Methods and apparatus are provided for the production of thermoplastic composite sheets whose fibers are other than perpendicular to the longitudinal axis of the sheet and which are capable of being slit into sheets, strips and/or tapes of custom widths.

20 Claims, 5 Drawing Sheets

Related U.S. Application Data

(60) Provisional application No. 62/551,217, filed on Aug. 28, 2017.

(51) Int. Cl.
  *B29C 70/08*   (2006.01)
  *B29C 70/20*   (2006.01)
  *B29C 70/50*   (2006.01)
  *B29C 70/54*   (2006.01)
  *B29K 101/12*   (2006.01)
  *B29K 307/04*   (2006.01)
  *B29K 309/08*   (2006.01)
  *B32B 5/02*   (2006.01)
  *B32B 5/12*   (2006.01)
  *B32B 7/12*   (2006.01)
  *B32B 27/08*   (2006.01)
  *B32B 27/12*   (2006.01)
  *B32B 37/20*   (2006.01)
  *B32B 37/26*   (2006.01)

(52) U.S. Cl.
  CPC ............ *B29C 70/202* (2013.01); *B29C 70/50* (2013.01); *B29C 70/545* (2013.01); *B32B 5/02* (2013.01); *B32B 5/022* (2013.01); *B32B 5/12* (2013.01); *B32B 7/12* (2013.01); *B32B 27/08* (2013.01); *B32B 27/12* (2013.01); *B32B 37/20* (2013.01); *B29C 2793/0036* (2013.01); *B29C 2793/0072* (2013.01); *B29C 2793/0081* (2013.01); *B29K 2101/12* (2013.01); *B29K 2307/04* (2013.01); *B29K 2309/08* (2013.01); *B32B 2037/268* (2013.01); *B32B 2260/023* (2013.01); *B32B 2260/046* (2013.01); *B32B 2262/101* (2013.01); *B32B 2262/106* (2013.01)

(58) Field of Classification Search
  CPC .. B32B 5/022; B32B 5/12; B32B 7/12; B32B 23/03; B32B 23/22; B32B 27/08; B32B 27/12; B32B 27/10; B32B 27/18; B32B 27/285; B32B 27/286; B32B 27/288; B32B 27/304; B32B 27/306; B32B 27/32; B32B 27/36; B32B 37/20; B32B 2250/03; B32B 2250/40; B32B 2260/023; B32B 2260/046; B32B 2262/101; B32B 2262/106; B32B 2270/00; B32B 2605/18; B32B 2037/268; B32B 2037/514; B32B 2037/518; B32B 2037/732; B29B 11/06; B29K 2101/12; B29K 2307/04; B29K 2309/08

USPC ...................................... 428/298.1
See application file for complete search history.

(56) References Cited

U.S. PATENT DOCUMENTS

| | | |
|---|---|---|
| 4,959,439 A | 8/1990 | Smith et al. |
| 4,969,681 A | 11/1990 | Schleicher et al. |
| 5,043,128 A | 8/1991 | Umeda |
| 5,165,941 A | 11/1992 | Hawley |
| 5,173,138 A | 12/1992 | Blauch et al. |
| 5,418,035 A | 5/1995 | Iguchi et al. |
| 5,660,913 A | 8/1997 | Coppage, Jr. |
| 5,766,725 A | 6/1998 | Hogenboom et al. |
| 7,807,005 B2 | 10/2010 | Rubin et al. |
| 7,871,553 B2 | 1/2011 | Wilkerson et al. |
| 8,425,708 B2 | 4/2013 | Rubin et al. |
| 8,795,457 B2 | 8/2014 | Rubin et al. |
| 9,248,613 B2 | 2/2016 | Wilkerson et al. |
| 9,498,915 B2 | 11/2016 | Bartel et al. |
| 9,511,538 B2 | 12/2016 | Rubin et al. |
| 10,603,821 B2 | 3/2020 | Fisher, Jr. et al. |
| 2010/0215887 A1 | 8/2010 | Kawabe |
| 2010/0319841 A1 | 12/2010 | Rubin et al. |
| 2012/0121852 A1* | 5/2012 | Tam ......................... D01F 6/04 428/221 |
| 2013/0213571 A1 | 8/2013 | Gloeckner et al. |
| 2015/0013888 A1 | 1/2015 | Matsen et al. |
| 2015/0053333 A1 | 2/2015 | Prebil et al. |
| 2015/0137427 A1 | 5/2015 | Matsen et al. |
| 2016/0023410 A1 | 1/2016 | Fisher, Jr. et al. |
| 2017/0087745 A1 | 3/2017 | Cawthorne |
| 2017/0190137 A1 | 7/2017 | Marcoe et al. |
| 2017/0326809 A1 | 11/2017 | Nishimura |
| 2018/0186101 A1 | 7/2018 | Ikeda et al. |

FOREIGN PATENT DOCUMENTS

| | | |
|---|---|---|
| JP | H02-115236 A | 4/1990 |
| JP | H07-227841 A | 8/1995 |
| WO | 9112136 A1 | 8/1992 |
| WO | 2019/122073 A1 | 6/2019 |

OTHER PUBLICATIONS

Gardiner, G., "The Spread of Tow," Composites World, Jun. 2018, pp. 30-36.

* cited by examiner

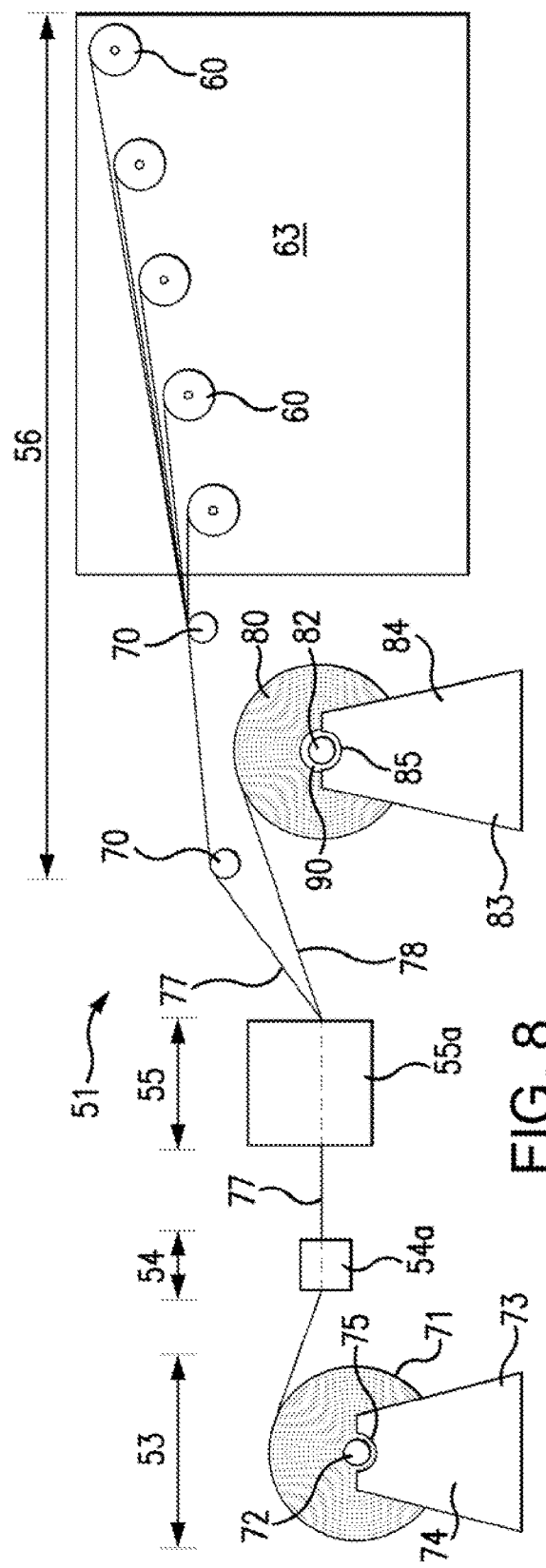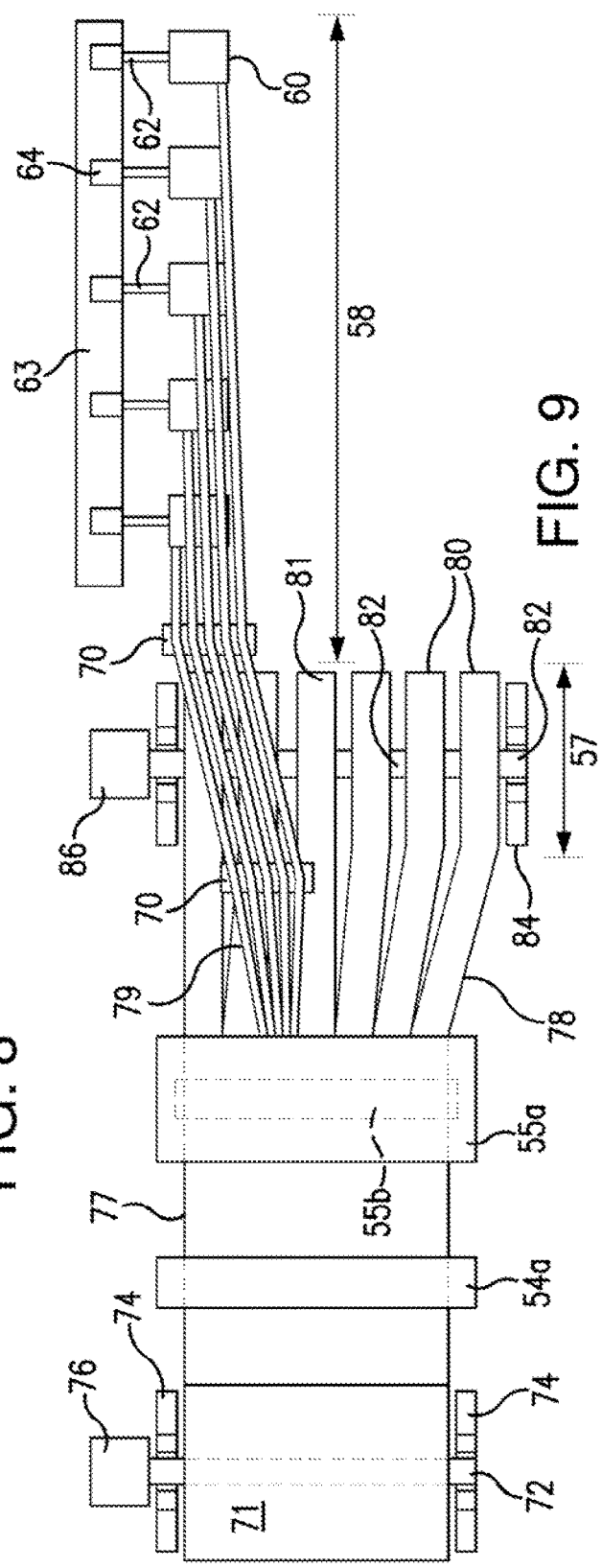

THERMOPLASTIC COMPOSITE MASTER SHEETS AND TAPES AND METHOD

The present application is a divisional application of U.S. patent application Ser. No. 16/114,141, filed Aug. 27, 2028, now U.S. Pat. No. 11,766,838, which claims the benefit of U.S. Provisional Patent Application No. 62/551,217 filed Aug. 28, 2017, entitled "Thermoplastic Composite Tapes, Method and Apparatus," the contents of both of which are hereby incorporated herein by reference in their entirety.

FIELD OF THE INVENTION

The present application is directed to the production of thermoplastic composite master sheet materials, master rolls formed from said master sheet materials, the slitting of said master sheet materials and/or master rolls for producing sheets, strips and tapes of thermoplastic composite sheet materials, and the resultant sheets, strips and tapes.

BACKGROUND

Advances in thermoplastic composite technology have had a marked impact on product design and engineering and, ultimately, manufacture. Early methods involved hand layup of fibrous mats and sheets with the subsequent impregnation of the laid up materials with either a molten thermoplastic or powdered thermoplastic and the subsequent thermoforming of the impregnated fibrous materials. Subsequent developments entailed the hand layup of stacks of pre-impregnated fibrous sheets and mats followed by compression forming and heating. Both processes saw rapid adoption and exploitation of these thermoplastic composite materials and technologies in many, though limited, fields and applications. For the most part, the adoption and use of these processes has been limited to the manufacture of relatively small and/or narrow parts and entail long production times owing to the limitations on the size of the thermoplastic composite sheets and mats that could be produced, the slow methodical build-up of the layers of the thermoplastic composite sheets or mats needed to provide the desired strength and durability to the part, and, in following, the very labor intensive nature of these process. While larger parts can be produced, their production requires expensive, large equipment whose costs generally outweigh the benefit of such methods, particularly in comparison to the use of thermosetting composite materials for producing the same or similar parts.

Advances in thermoplastic composite materials and processing technology led to semi-continuous or semi-autonomous manufacturing techniques wherein stacks of thermoplastic sheets or mats having different orientations of the fibrous materials contained therein are built, one upon the other, to form a sheet stack which is then tack welded at various predetermined locations to immobilize the various layers and form the one-piece multi-layered sheet stack. These multilayered sheet stacks can then be transported to the production site and used as is or, depending upon the requirements of the part forming process, can be cut to a more appropriate size. Depending upon the part being made, the sheet stacks may be combined with one or more additional sheet stacks and/or a monolayer thermoplastic composite sheet and/or nugget filler in a heating and molding apparatus/compressor for thermoforming the parts therefrom. These processes and advances are shown in, for example, Rubin et. al. —U.S. Pat. Nos. 7,800,705 and 8,795,457.

More recent advances, as shown in Rubin et. al. —U.S. Pat. No. 8,435,708, extend the aforementioned processes even further, allowing for a more continuous process. Here, rather than use the tacked multi-layered sheet stacks as is, Rubin et. al. suggest slitting the multi-layered sheet stacks and abutting the cut strips of the stacked thermoplastic sheets end-to-end to form a continuous sheet material that is then rolled to form master rolls. Though not mentioned in Rubin et. al., those skilled in the art will readily appreciate that this process requires a multitude of additional tack welding sites in the stack of composite sheet materials in order to ensure that the layers of each strip are securely tack welded to one another even after being cut into strips. Furthermore, this process introduces a number of additional limitations in that one is limited in the number of layers in the sheet stack as the thicker the stack, particularly with two or more fiber orientations, the more difficult it is to slit and wind due to the growing stiffness of the sheet stack. Additionally, because the layers are not actually fused to one another across their mated faces, there is movement in the layers during the cutting and winding processes which, together with the inability to precisely align the strips, cause the tapes to have jagged edges and establish new and increased stress and strain into the rolled material: stresses and strains that can affect the properties and strength of the final part.

In an alternative version, Rubin et. al.—'708 suggest cutting a mono-layer of the conventional thermoplastic composite sheet at different angles and abutting and fusing them edge-to-edge to form a continuous oriented thermoplastic composite sheet having fibers that are other than parallel with the longitudinal axis of the sheet. The resultant sheet is then mated with and tack welded at various predetermined locations to another continuous sheet of a conventional thermoplastic composite sheet material whose fibers are parallel to the longitudinal axis of the sheet. The so formed bi-layer bias ply material is then rolled to form master rolls. Though not addressed in Rubin et. al., it is now believed that the use of the conventional thermoplastic composite sheet material is necessary to address the weakness of the bond or weld between the mated sheets. While this is not or is certainly less of a concern in hand layup operations, it is of great concern if one hopes to provide an automated, continuous process, particularly one that is intended to run at a commercially feasible rate. Specifically, high speed processing inherently introduces tension into the material as it is being wound, unwound, and/or fed into the heating and molding apparatus: the faster the process, the greater the tension. If there is a break, then the whole process must be shut down to correct the situation and, if necessary, refeed the feed lines of material. Additionally, as with the previous alternative, the tack welding again introduces issues into the wound materials.

In any event, in both of the foregoing instances, the so formed master rolls are used in-line with a thermoforming and compression apparatus to form the desire thermoplastic composite article. These advances eliminate the need for hand lay-up and reduced the need for costly lay-up equipment and large manufacturing spaces needed to accommodate multi-axis layup operations in the manufacture of finished parts. With this advance, the master rolls could simply be lined up along the axis of the production line and multi-layered/bias-ply thermoplastic parts made therefrom in a more cost-effective manner, as shown in FIG. 7 of Rubin et. al. '708.

Despite these advances, the process is still time consuming and costly, especially in the production of the master rolls, and entails significant waste associated with part manufacture. For example, both of the aforementioned processes for the production of the master rolls require significant equipment just to create the stacks and the angled fiber tapes, and then additional equipment and steps to then tack weld the layers together so they can be cut and/or rolled and further processed. Furthermore, because the conditions for tack welding the layers together are less than employed to form the finished part and the welds themselves are spatially dispersed across the face of the composite materials, the degree, strength and/or extent, of their fusing is likewise very limited and, as noted above, with the concurrent rolling, new stresses are introduced into the thermoplastic composite materials which can, among other concerns, cause a failure in the fuse and/or affect the orientation of the layers to one another.

Additionally, for all their benefits, these processes introduce another factor that is not found or is, at least, less of an issue with hand layup processes where the fibers or fabric or mat is placed in the mold and the polymer infused into the fabric or even where pre-impregnated mats are laid in a mold. Specifically, hand layup, despite its many issues, allows one to custom cut and size the fabric and/pre-impregnated mats; whereas, because of the cost and time constraints, associated with these newer processes and the production of master rolls, one is commercially limited to the production of master rolls of standard width sizes. In this regard, it becomes unfeasible from a cost perspective to provide and set up equipment and the like necessary to produce a myriad of widths as one needs to address time commitments; costs of materials and equipment; setup and the retooling and/or reconfiguring of systems; etc.

The consequence of being reliant upon or limited to standard width master rolls is multifold. First, in design production, engineers are limited in their ability and versatility on how to design and plan the production of a given part by the widths of the composite materials they have available to them. Secondly, because of these limitations, it is clear that certain parts simply cannot be made from the available master rolls, especially those that would otherwise require very narrow width composite sheet materials. Thirdly, even when a part can be made, because the parts to be made are not of standard widths, there is a lot of waste as the excess must be trimmed. Additionally, while certain widths may be just right for a given part, one typically must use a wider width material as the edges of the master rolls are not even, i.e., have jagged edges, owing to the cutting and difficulty in precisely aligning the cross-plies in either of the alternative processes.

The issue of thermoplastic composite sheets having jagged edges is not of concern where the parts to be manufactured are small and a single width of thermoplastic composite material is adequate wherein the jagged edges are trimmed off of the final part. However, when making large parts and/or where multiple layers of the thermoplastic composite sheet required, the jagged edges become a concern since they are incorporated into the part. Specifically, in making such large parts the sheets of each layer, whether the stacked composite material or the bias-ply material or both, must be laid side-by-side and, most often, one or more layer of sheets applied atop those. As a result, because the jagged edge of one sheet abuts the jagged edge of another, one ends up with voids or gaps between the adjacent sheets in a given layer, regardless of the precision of the placement of the sheets. While these gaps or voids may not be problematic in low-tech articles of manufacture, e.g., a cover of a storage chest, an automobile hood, etc., this is a significant problem where precision manufacture is required, e.g., high-tech aerospace and aircraft parts/component manufacture. In the latter, any gap or void represents a potential failure site or propagation site for failure. Hence, such high tech manufacturing requires extreme precision and exact matching where sheets are laid edge to edge and absolute continuity of the polymer resin in the composite structure.

Accordingly, despite all the advances that have been made, there still remains a need in the industry for a simpler, less capital intensive, less spatially demanding, and less costly process and apparatus for producing master rolls of oriented thermoplastic composite sheet and for the use thereof in producing thermoplastic composite articles.

In fallowing there is need for a more cost effective process for producing thermoplastic composite articles which avoids or minimizes waste.

Additionally, there is a need for a cost effective process which allows for the production of custom width thermoplastic composite sheets and tapes of all fiber orientations so that part production is no longer dependent upon standard widths of such materials. In this respect, there is a need for a process which allows for the part design and manufacture to dictate what widths composite sheet materials are to be used rather than the available widths of materials controlling whether and how a part is made. Such a result would not only make part design and engineering easier but also greatly expand the end-use applications into which thermoplastic composite materials may be used.

In particular, there is a need for the ability to make thermoplastic composite tapes of different fiber orientations whose widths are but a couple inches or less, even an inch or less, for addressing specific high tech applications that currently are only capable of being addressed by thermosetting composite slit tapes.

Additionally, there is a need for a process of producing thermoplastic composite sheet materials and tapes having precision widths where width variance along the length of a given strip of thermoplastic composite material is fractions of an inch, even hundredths or thousands of an inch, as required in certain high tech, aerospace and aircraft production processes.

Further, there is a need for a process of producing thermoplastic composite sheet materials and tapes having precision straight edging, especially without fiber fraying, such that side-by-side layup is possible without gaps and voids.

Finally, there is need for a process for accomplishing any and all of the foregoing in a commercially viable, cost effective manner without significantly increasing, if not avoiding any increase in, production costs and/or which can be implemented without a significant capital investment and without compromising or sacrificing production rate and quality, preferably while enhancing production rate and quality.

SUMMARY

According to first aspect of the present teaching there is provided a method of making a master sheet material of oriented thermoplastic composite sheet said method comprising a) cutting a thermoplastic composite sheet material whose fibers are parallel with the longitudinal axis of the sheet material into a plurality of segments of a desired length, the resulting segments having cut ends and side edges, the cuts being at an angle relative to the longitudinal axis of the thermoplastic composite sheet material, b) aligning the segments next to each other, edge-to-edge or with a slight overlap, preferably with the fibers of each segment parallel to the fibers of the other segments, c) fusing or welding the side edges or overlap to form a continuous sheet of the thermoplastic composite segments having an upper and a lower surface (this sheet also referred to as the oriented thermoplastic composite sheet), d) mating at least one of the upper or lower surface of the so formed continuous sheet of thermoplastic composite segments to a mating surface of a carrier sheet material, the mating surface of the carrier sheet material having an adhesive or tacky material applied thereto, and e) either i) winding the resulting oriented sheet material on a mandrel, spool, axel, or the like to form master rolls or ii) feeding the so formed oriented master sheet material on to further processing. In the case of master rolls, the master rolls may then be transported or stored for further processing.

Although the angle of the cutting to form the cut segments can be any angle, preferred angles are 30°, 45°, 60°, 90°, −60°, −45°, and −30°. The lengths of the cut segments can be any length, though for the preferred intended purpose, as noted below, it is preferred that the segment lengths be sufficient to form master rolls whose widths are from about 0.1 to about 3 meters or more, preferably from about 0.3 to about 2.5 meters, more preferably from about 0.5 to about 2 meters. Preferred carrier sheet materials are polymer films wherein the polymer material, in film form, is flexible but has no or minimal elongation, preferably no more than 10%, preferably no more than 5% elongation. Other suitable carrier sheet materials include polymeric non-woven, paper and other cellulosic sheet materials. The adhesive is preferably a tack adhesive, a pressure sensitive adhesive, or an adhesive that becomes tacky upon exposure to certain conditions, e.g., temperature, Most preferably, the adhesive is selected to have adhesive rather than cohesive failure when separating the carrier from the thermoplastic composite sheet and greater adhesion to the carrier than the thermoplastic composite sheet.

In the foregoing method, it is possible to incorporate an additional step whereby at least one additional thermoplastic composite sheet material is longitudinally mated with and fused, spot welded or tack welded to the oriented thermoplastic composite sheet prior to or subsequent to the mating thereof with the carrier sheet material. If prior to, then it is to be appreciated that either the additional thermoplastic composite sheet or the oriented thermoplastic composite sheet will be adhered to the mating surface of the carrier sheet material. Most preferably though, the oriented thermoplastic composite sheet will be directly mated with and adhered to the mating surface of the carrier sheet material.

According to a second aspect of the present teaching there is provided a method of making a master sheet material of oriented thermoplastic composite sheet said method comprising a) aligning and mating along their longitudinal axes i) a mono-layered oriented thermoplastic composite sheet material whose fibers are angled with respect to the longitudinal axis of the sheet material with ii) the mating surface of a carrier sheet material, the mating surface of the carrier sheet material having an adhesive or tacky material applied thereto, and b) either i) winding the resulting oriented sheet material on a mandrel, spool, axel, or the like to form master rolls or ii) feeding the so formed oriented master sheet material on to further processing. In the case of master rolls, the master rolls may then be transported or stored for further processing. In this iteration of the present teaching, steps (a) through (c) of the first aspect of the present teaching are bypassed and replaced with a preformed roll of an oriented thermoplastic composite sheet.

As with the first aspect of the present teaching, in an alternate iteration of this process, an additional step may be incorporated therein wherein at least one additional thermoplastic composite sheet material is mated and fused, tack welded or spot welded along their longitudinal axes to the oriented thermoplastic composite sheet prior to or subsequent to the mating thereof with the carrier sheet material. Alternatively, the preformed oriented thermoplastic composite sheet may be a multi layered composite sheet having at least one layer of an oriented thermoplastic composite sheet. In both instances, it is especially preferred that the oriented thermoplastic composite sheet layer be directly mated and adhered to the carrier sheet material.

According to a third aspect of the present teaching there is provided a method of making a master sheet material of thermoplastic composite sheet materials which method comprises a) aligning and mating along their longitudinal axes i) two thermoplastic composite sheet materials and ii) a carrier sheet material whereby the carrier sheet material is intermediate or sandwiched between the two thermoplastic composite sheet materials, the carrier sheet material having an adhesive or tacky material applied to both surfaces thereof and b) either i) winding the resulting oriented sheet material on a mandrel, spool, axel, or the like to form master rolls or ii) feeding the so formed oriented master sheet material on to further processing. In the case of master rolls, the master rolls may then be transported or stored for further processing. In this iteration the thermoplastic composite sheet materials may both be mono-layered or multi-layered or one of the thermoplastic composite sheet materials may be mono-layered and the other multi-layered. Most preferably, at least one, preferably both, of the two thermoplastic composite sheet materials is or, in the case of a multi-layered thermoplastic composite sheet material, includes an oriented thermoplastic composite sheet wherein the fibers are angled with respect to the longitudinal axis of the sheet.

In accordance with a fourth aspect of the present teaching there is provided a method of forming continuous sheets, strips, or tapes of thermoplastic composite materials, said method comprising feeding a master sheet material, especially those made in accordance with any of the first, second and third aspects of the present teachings, through a slitting apparatus having one or more knives, blades or cutters and whose knives, blades or cutters are configured to slit the thermoplastic composite sheet material into sheets, strips and/or tapes of predetermined widths. The so formed sheets, strips or tapes may then be wound on a spool, axel, reel, spindle or the like or passed on to further processing, including directly to part manufacture. Whichever of the foregoing steps is taken, the carrier material may be removed after slitting and prior to winding or being subsequently processed; but in any event is removed if the slit material is directly employed in part manufacture. Preferably, the thermoplastic composite sheet materials used in this process are or include a mono-layer oriented thermoplastic composite sheet in which the fibers are other than parallel to the longitudinal axis of the thermoplastic composite sheet material being slit.

As noted, the fourth aspect pertains to the feeding of a master sheet material through the slitter. Most typically, this process is a separate process in which the master sheet material is fed to the slitter from a master roll of the master sheet material. Alternatively, the slitting may be another step in the process in which the master sheet materials are formed wherein a direct feed of the master sheet material once formed, for example, that formed in any of the first, second and third aspects, is fed to the slitter. Here the step of winding of the master rolls of the master sheet material is bypassed.

In accordance with a fifth aspect of the present teaching there is provided novel master rolls of thermoplastic composite sheet material comprising a thermoplastic composite sheet material whose fibers, or the fibers of at least one layer in the case of multi-layered materials, are angled with respect to the longitudinal axis of the sheet material and a carrier sheet material adhesively bonded thereto, said master rolls characterized as being capable of being slit with the carrier sheet material attached while maintaining product integrity and tolerances. Specifically, there are provided master rolls wherein successive windings of the thermoplastic composite sheet material are separated by a carrier sheet material adhesively bonded thereto.

In accordance with a sixth aspect of the present teaching there is provided novel master rolls of thermoplastic composite sheet material comprising two thermoplastic composite sheet materials, one adhered to each surface of the carrier sheet material whereby the carrier sheet material is sandwiched between the thermoplastic composite sheets and the successive windings have one thermoplastic composite sheet overlaying the other. These master rolls, like the foregoing, are characterized as being capable of being slit with the carrier sheet material attached while maintaining product integrity and tolerances.

In both of the fifth and sixth aspects as described above, the thermoplastic composite sheet materials may be monolayered or multi-layered or, in the case of the sixth aspect, one of each. Although the master rolls may be formed of thermoplastic composite sheets wherein the fibers are parallel to the longitudinal axis of the sheet material, it is preferred that thermoplastic composite sheet(s) master rolls be or include at least one layer that is an oriented thermoplastic composite sheet wherein the fibers are at an angle to the longitudinal axis of the sheet.

Furthermore, in both the fifth and sixth aspects as described above, the carrier sheet material a) has one or two mating surfaces, respectively, upon which is present a tacky, pressure sensitive or tack forming adhesive for bonding the carrier to the thermoplastic composite sheet material and b) is flexible but has no or minimal elongation. Most preferably, the carrier sheet material is polymer film or nonwoven, most especially a polymer film, that is capable of being slit without tearing, without the formation of fibrils, and without separating from the thermoplastic composite sheet material during the slitting process. Similarly, in the fourth aspect of the present teachings, the process may include an additional step whereby the carrier sheet is removed from the slit composite sheet material before being wound or passed on to further processing. In the case of the carrier sheet having thermoplastic composite sheets on both sides, the slit material may be wound as is or, if the carrier is to be removed before winding, the slit materials will be wound on separate reels, spools, spindles or the like.

These and other aspects, details and benefits of the present teachings will be more fully described in and apparent from the specification below and the appended figures.

BRIEF DESCRIPTION OF THE DRAWINGS

The accompanying drawings which form a part of the specification are to be read in conjunction therewith. Like reference numerals are employed to indicate like parts in the various views.

FIG. 8 is a schematic side view of a slitting apparatus configured to slit the oriented sheet material into both wide and narrow strips or tapes.

FIG. 9 is a schematic top view of the apparatus of FIG. 8.

DETAILED DESCRIPTION

Figure 1A:
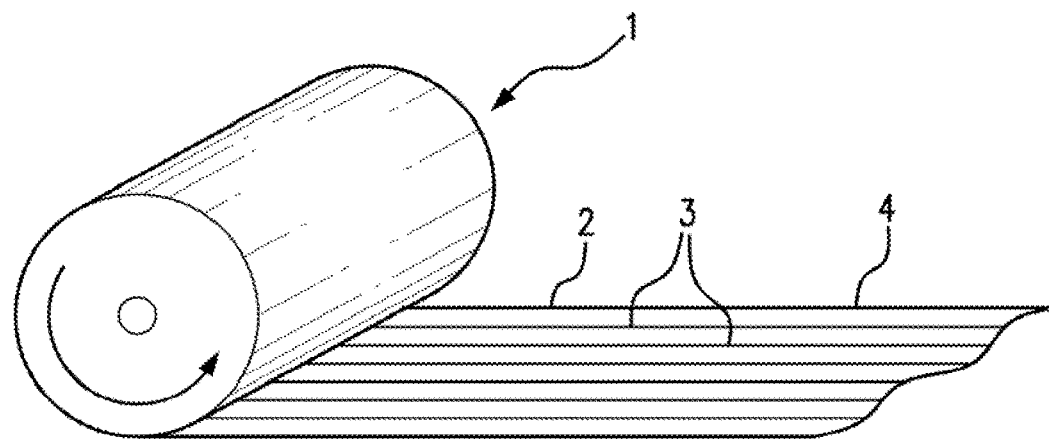
FIG. 1A is perspective view of a roll of a conventional monolayer thermoplastic composite sheet material being unwound.

The following definitions are understood to apply to the singular as well as the plural, though only the singular is mentioned.

In order to avoid confusion as to which thermoplastic composite materials are being referenced in the specification and the appended claims, the following terms shall have the meanings as presented:

the term "thermoplastic composite sheet," in the absence of any further modifiers, especially as noted in the following, means a continuous monolayer sheet of thermoplastic polymer having incorporated therein a plurality of unidirectional or substantially unidirectional fibrous materials, the term "conventional thermoplastic composite sheet" means a thermoplastic composite sheet wherein the fibers are parallel to the longitudinal axis (i.e., length) of the sheet, the term "multi-layered thermoplastic composite sheet material" means that structure formed by overlaying, along their longitudinal axes, and fusing, spot welding or spot tacking two or more thermoplastic composite sheets to one another, provided that the number of layers are not such that the thickness of the multi-layered thermoplastic composite sheet material is difficult to slit or wind, the term "oriented thermoplastic composite sheet" means a thermoplastic composite sheet or multi-layered thermoplastic composite sheet material wherein the fibers of the thermoplastic composite sheet or, in the case of the multi-layered thermoplastic composite sheet material, the fibers of at least one layer thereof are other than parallel to the longitudinal axis of the sheet, the term "master sheet material" means that structure comprising a carrier sheet material having adhered to at least one surface thereof a thermoplastic composite sheet and/or or multi-layered thermoplastic composite sheet material, and the term "oriented master sheet material" means a master sheet material wherein at least one of the thermoplastic composite sheets and/or multi-layered thermoplastic composite sheet materials adhered to the carrier sheet material is or includes an oriented thermoplastic composite sheet.

As used herein and in the appended claims, the term "continuous" when used in reference to any of the aforementioned thermoplastic composite sheet and thermoplastic composite sheet containing materials means long lengths of such materials whereby these materials may be wound for storage and/or transportation. While shorter length materials can be produced and processed in accordance with the teachings presented herein, such shorter materials are commercially impractical from a cost and automated, continuous manufacturing perspective. Typically, these continuous materials will have lengths of from at least about 10 meters, more typically about 25 meters, up to about 100 meters, preferably up to 1000 meters or more in the case of the master sheet materials and thousand or tens of thousands of meters in length in the case of the slit materials. Widths in the case of the master sheet materials and master rolls will be on the order of from about 0.5 to about 3 meters or more, preferably from about 0.75 to about 2.5 meters, more preferably from about 1 to about 2 meters. Widths in the case of the slit oriented sheet materials will be on the order of from about 0.005 meters to about 2 meters, preferably from about 0.01 meters to about 1 meter, smaller or larger widths can be made, as necessary, depending upon the desired end-use application.

Finally, as used herein and in the appended claims, the term "polymeric non-woven" means a polymeric non-woven fabric which, as well known to those of ordinary skill in the art, is defined as a porous fabric-like material made from staple polymer fibers (short) and long polymer fibers (continuous long), bonded together by chemical, mechanical, heat or solvent treatment As noted above, thermoplastic composite sheets are well-known and described in the literature. Generally, they are characterized as comprising a thermoplastic matrix polymer reinforced with fibrous materials, typically a plurality of fibers. The can be produced by a number of known and well-established methods including pultrusion, infusion, and the like. Exemplary thermoplastic polymers include polyethylene, polypropylene, polyamide, polyphenylene sulfide (PPS), polyetherimide (PEI), polyetherether-ketone (PEEK), polyether-ketoneketone (PEKK), and the like, as well as copolymer and/or blends thereof.

As pertains to the key aspects of the present teachings, the fibers of the thermoplastic composite sheet or the individual layers thereof in the case of a multilayered thermoplastic composite sheet material are preferably unidirectional.

Depending upon the production of the thermoplastic composite sheet, the fibers may be coplanar or substantially coplanar, staggered, stacked, commingled, etc.: such that a cross-section of the thermoplastic composite sheet will show the ends of the fibers in a set or random pattern. The fibrous material may be fibers, filaments, bundles, yarns, etc.; though for convenience, the teachings shall be discussed in terms of the use of fibers. The fibers are most typically carbon fibers though other fibers may be used as well including glass fibers, such as the e-type and s-type glass fibers. Notwithstanding the foregoing, in the instance of those processes and sheet materials involving multi-layered composite sheet materials it is to be understood that the additional composite sheet material may further contain chopped fibers that are randomly arranged or said multi-layered composite sheet material may contain a sheet of a thermoplastic composite material having chopped fibers that are randomly dispersed therein.

As one of ordinary skill in the art will appreciate, the relative types, thickness, amount, etc. of the fibers as well as the selection of the thermoplastic polymer and the overall thickness of the composite sheet vary widely and are, in part, selected based upon a number of factors including costs and the ultimate desired physical and mechanical properties of the thermoplastic composite structure or article to be produced and its end-use application. Typically, the thickness of the monolayer thermoplastic composite sheet will be from about 0.01 mm to about 4 mm, preferably from about 0.02 mm to about 0.5 mm: though thicker or thinner monolayers can be used as well provided that the same are still sufficiently flexible to wind either as a master roll or as slit sheets, strips and/or tapes.

For the most part, the following discussion of the present teachings will be discussed and addressed in terms of the production and use of oriented thermoplastic composite sheets and oriented master sheet materials wherein the oriented thermoplastic composite sheets are mono-layers. However, it is to be appreciated that these teachings equally apply to multi-layered versions of the foregoing, as well as, more generally speaking, the use of thermoplastic composite sheets, as mono- and/or multi-layered materials, and master sheet materials made therefrom. As noted, the multi-layered thermoplastic composite sheet materials comprise two or more, preferably no more than 5, more preferably no more than 4, most preferably two or three mono-layers. These multi-layered thermoplastic composite sheet materials are formed by successively overlaying a plurality of thermoplastic composite sheets, which may or may not be mono-layered oriented thermoplastic sheets, upon the other along their longitudinal axis and fusing, tack welding or spot welding each successive layer to the other. Additionally, in each of the processes described herein for the production of the master sheet materials, it is to be appreciated that the width of the sheets to be aligned and mated will be the same or substantially the same.

As discussed in the background section above, the use of such multi-layered thermoplastic composite sheet materials is not or is less desirable due to the inability to sufficiently secure each layer to the next for the slitting and winding and subsequent processing. This is especially problematic where the slit sheet, strip and/or tapes to be formed are of narrow widths, e.g., a couple inches or less, most especially an inch or less. In any event, an exemplary multi-layered thermoplastic composite sheet material formed of a conventional thermoplastic composite sheet and a mono-layered oriented thermoplastic composite sheet is taught in Rubin et. al. U.S. Pat. No. 8,435,708, the contents of which are incorporated herein in their entirety.

According to a first aspect of the present teaching there is provide a method of making a master sheet material of oriented thermoplastic composite sheet said method comprising a) cutting a conventional thermoplastic composite sheet whose fibers are parallel with the longitudinal axis of the sheet material into a plurality of segments of a desired length, the resulting segments having cut ends and side edges, the cuts being at an angle relative to the longitudinal axis of the composite sheet, b) aligning the segments next to each other, edge-to-edge or with a slight overlap, preferably with the fibers of each segment parallel to the fibers of the other segments, c) fusing or welding the side edges or overlap to form a continuous sheet of the thermoplastic composite segments having an upper and a lower surface, d) mating at least one of the upper or lower surface of the so formed continuous sheet of thermoplastic composite segments to a mating surface of a carrier sheet material, the mating surface of the carrier sheet material having an adhesive or tacky material applied thereto, and e) either i) winding the resulting structure on a reel, spool, axel, or the like to form a master roll or ii) feeding the so formed oriented master sheet material on to further processing.

In preparing the oriented thermoplastic composite sheet, the angle of the cutting can be any angle; however, from a practical and current product design and manufacturing standpoint, the angles are preferably 30°, 45°, 60°, 90°, −60°, −45°, and −30°. Similarly, the lengths of the cut segments can be any length, subject, of course to practical limitations, though for the preferred intended purpose, as noted below, it is preferred that the segment lengths be sufficient to form master rolls whose widths are from 0.5 to about 3 meters or more, preferably from about 0.75 to about 2.5 meters, more preferably from about 1 to about 2 meters The carrier sheet material to which the oriented thermoplastic composite sheet is bonded can be any suitable sheet or film material that has sufficient flexibility to allow it to be rolled or wound without cracking or tearing, has no or essentially no elongation, preferably no more than about a 10% elongation, more preferably no more than about 5% elongation, at room temperature. Most especially, there is no or essentially no elongation or stretching of the carrier material under the conditions in which the oriented sheet materials of the instant teachings are slit and wound. In either instance, most preferably any elongation is without yield and with full elastic recovery, again under the conditions of the present process. Exemplary carrier materials include polymer films, polymeric non-woven, paper and other cellulosic sheet materials, most especially polymer films. Exemplary polymer films that may be used as the carrier sheet material include polyethylene, polypropylene, biaxially oriented polypropylene, polyvinylchloride, ABS, EVOH, methylcellulose, polyesters and the like.

As noted, the carrier sheet material has applied to at least one surface thereof, an adhesive or bonding material with which to bond the carrier film to the oriented thermoplastic composite sheet, or, if both surfaces of the carrier sheet material are mating surfaces, to the thermoplastic composite sheets, at least one of which is an oriented thermoplastic composite sheet. The adhesive is preferably a tack adhesive, a pressure sensitive adhesive, or an adhesive that becomes tacky upon exposure to certain conditions, e.g., temperature. A tack adhesive is one where a liner overlies the adhesive on the carrier sheet material until the carrier is to be mated to oriented thermoplastic composite sheet. Such adhesive materials are well known and will be selected based, in part, upon the process to be employed for bonding the carrier sheet material to the oriented thermoplastic composite, the matrix polymer, the carrier film material, etc.; all of which is well known to those of skill in the art, particularly the thermoplastic and thermoplastics bonding art. Most preferably, the adhesive is selected to have adhesive rather than cohesive failure when separating the carrier sheet material from the thermoplastic composite sheet and greater adhesion to the carrier sheet material than the thermoplastic composite sheet. Simple trial and error can be undertaken to identify the optimal adhesive for the given set of materials.

Figure 1B:
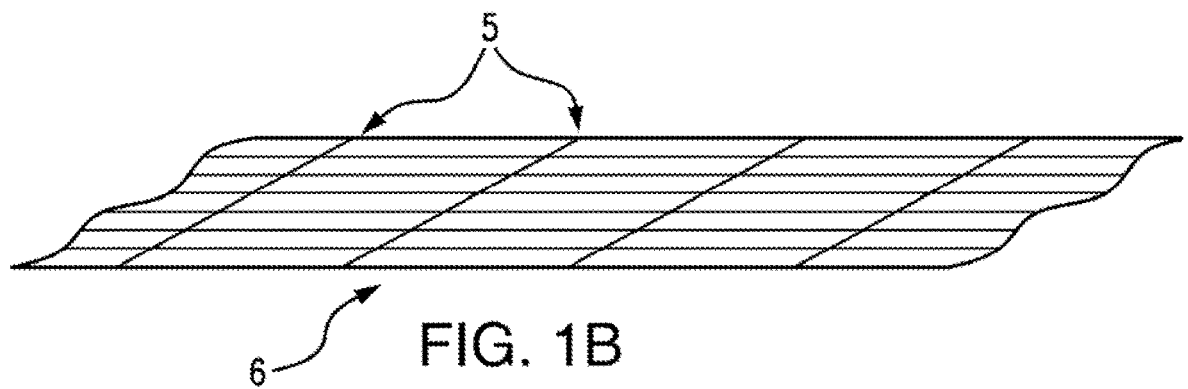
FIG. 1B is a perspective view of the unwound sheet material being cut into segments.
Figure 1C:
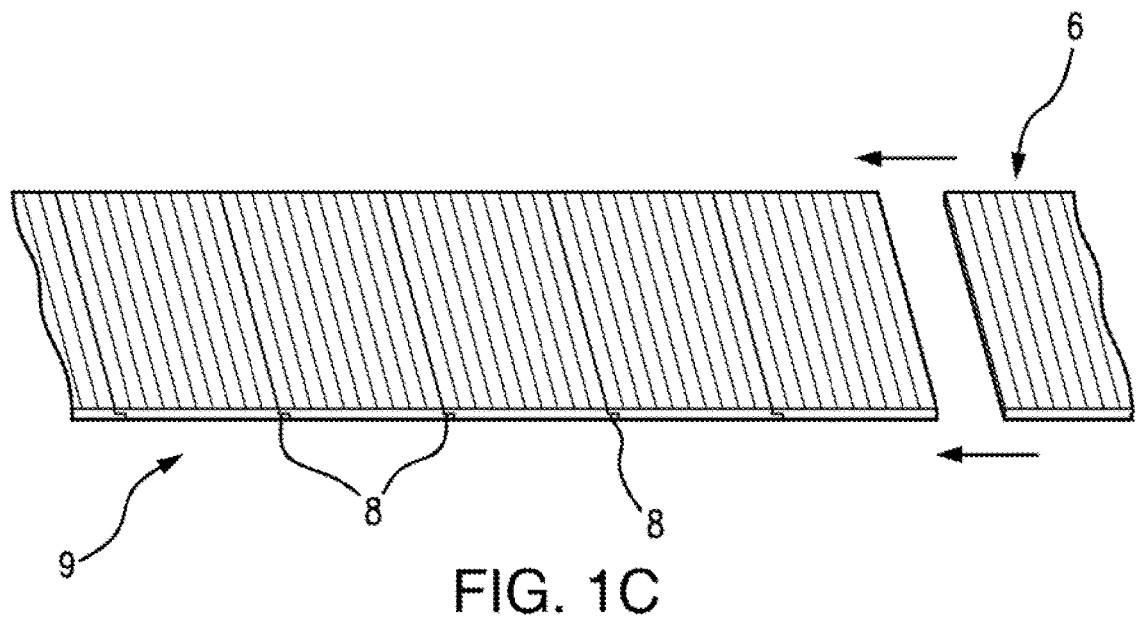
FIG. 1C shows the assembly of an oriented thermoplastic composite sheet wherein the cut segments from FIG. 1B are aligned, mated edge-to-edge and welded or fused together to form a continuous sheet.
Figure 1D:
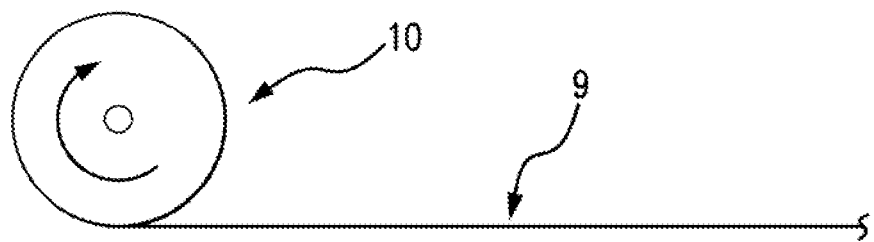
FIG. 1D is a schematic side view representation of the process of winding the oriented thermoplastic composite sheet formed in FIG. 1C.
Figure 1E:
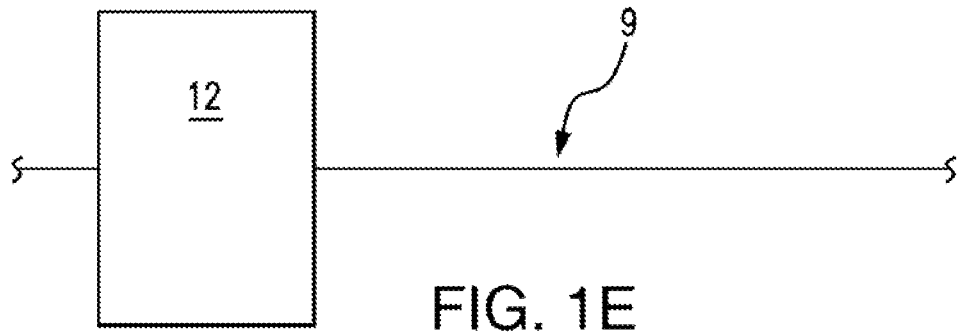
FIG. 1E is a schematic side view representation of an alternate process wherein the oriented thermoplastic composite sheet formed in FIG. 1C is fed to a subsequent processing step.

Turning to FIG. 1A through 1D, there is presented as step-wise method for the production of a master roll of oriented thermoplastic composite sheet. As seen in FIG. 1A, a master roll 1 of conventional thermoplastic composite sheet 4 comprising the thermoplastic matrix polymer 2 and parallel fibers 3 is unwound and, as shown in FIG. 1B, cut 5 into a plurality of segments 6. As noted above, the cut may be at any angle relative to the longitudinal axis or the thermoplastic composite sheet, Preferably, though, cuts are at angles of 30°, 45°, 60°, 90°, −60°, −45° and −30°. As shown in FIG. 1C, the segments are then rotated so that the edges of the cut segments align with and are parallel to each other, preferably, though not necessarily, with the fibers of each segment parallel to the fibers of each other segment, and mated to each. The segments are then mated either edge-to-edge or with a slight overlap to form a seam 8 which is then welded or fused to form a continuous oriented thermoplastic composite sheet 9. Finally, the continuous oriented thermoplastic composite sheet is either wound (FIG. 10) into a master roll 10 for further use and processing or is traversed along to a subsequent processing apparatus 12 for further processing (FIG. 1E).

Figure 5:
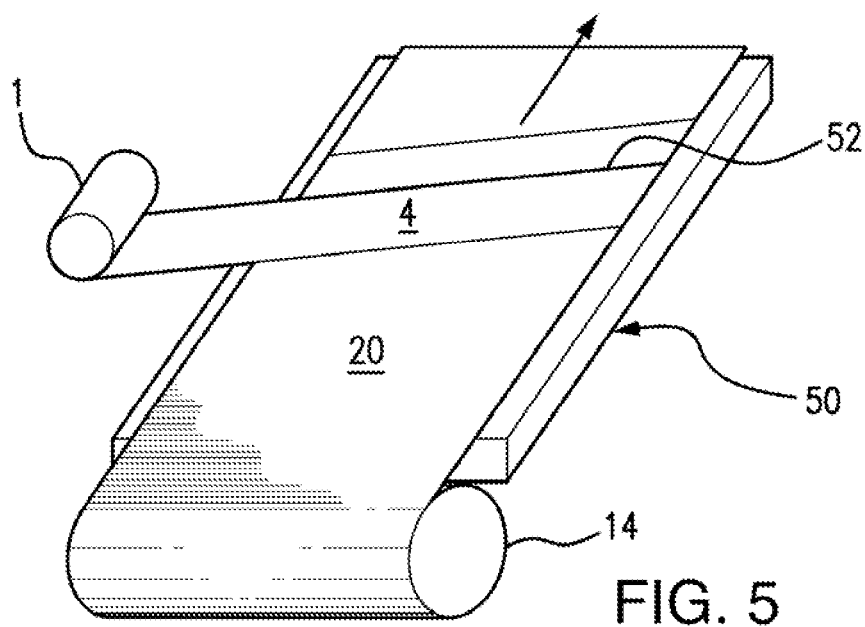
FIG. 5 is a schematic perspective view of an automated process for producing oriented thermoplastic composite sheets.
Figure 6:
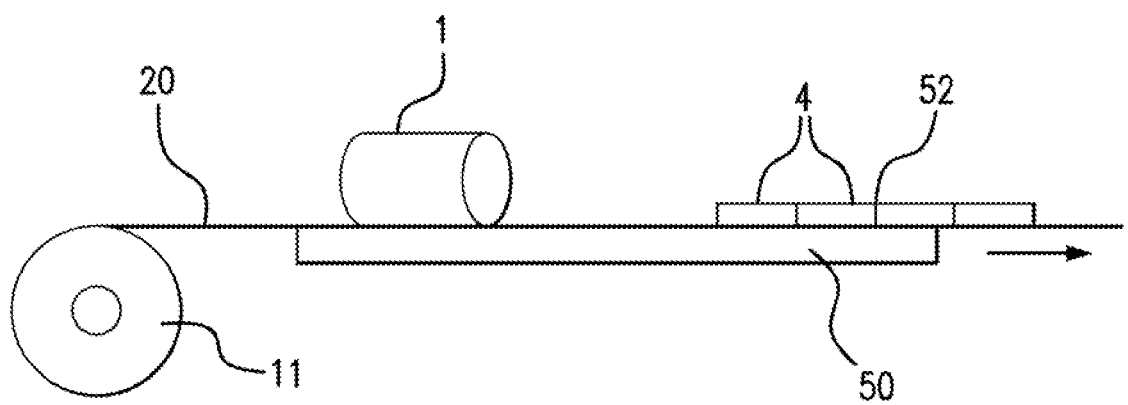
FIG. 6 is a schematic side view of the automated process of FIG. 5.

FIGS. 5 and 6 present another process and schematic apparatus for producing the oriented master sheet materials. Here a conveyor table 50 is employed having, at one end, a master roll 14 of a carrier sheet 20 material and to one side a robotic apparatus (not shown) which holds a master roll 1 of conventional thermoplastic composite sheet 4. The carrier sheet material 20 is advanced with its mating surface facing upwards by the conveyor table 50 along the full length of the conveyor table, as shown by the arrow in FIG. 5. The robotic apparatus then lays strips of the conventional thermoplastic composite sheet 4 across the mating surface of the carrier sheet material, beginning at the far edge of the carrier sheet material and ending at the near edge: the far and near edges being relative to the placement of the robotic apparatus. The robot is configured so that the strips being laid are side by side or with a slight overlap and perpendicular to or some other angle to the longitudinal axis of the carrier sheet material and the movement of the conveyor table. The robotic apparatus includes a cutter element to cut the thermoplastic composite sheet at the near edge and a welding or fusing apparatus so that it fuses or welds the seam 52 where the edges of the sequential strips of thermoplastic composite meet or overlap. The so formed oriented sheet material is either rolled into master rolls for later processing or the conveyor table may feed directly to another processing step, including to a slitter apparatus.

Depending upon the set-up desired, the conveyor apparatus 50 may advance after placement of each strip of thermoplastic composite sheet or after placement of a plurality of such sheets. In the former, the robotic apparatus is stationary relative to the near edge of the conveyor apparatus whereas in the latter the robotic apparatus is capable of traversing along the near edge of the conveyor apparatus.

While the foregoing discussion of the apparatus of FIGS. 5 and 6 has been focused on the formation of the oriented master sheet materials, those skilled in the art will readily appreciate that it can also quite easily be reconfigured to produce the oriented thermoplastic composite sheet. Specifically, this apparatus would not have the master roll of carrier sheet material; rather, the apparatus and process would simply employ the conveyor table and the robotic apparatus, except here, rather than having the robotic apparatus lay the thermoplastic composite sheet 4 on the carrier sheet material, it would be laid directly on the conveyor table surface. The strips of thermoplastic composite sheet 4 would extend whatever distance across the surface of the conveyor table necessary to make the oriented thermoplastic composite sheet the desired width. The so formed oriented thermoplastic composite sheet could then be wound into a master roll for subsequent use, e.g., for mating with a carrier sheet material, or directly fed into the mating process with the carrier sheet material to form a master roll of oriented sheet material or it could be fed directly into the mating process with the carrier sheet material.

Figure 2A:
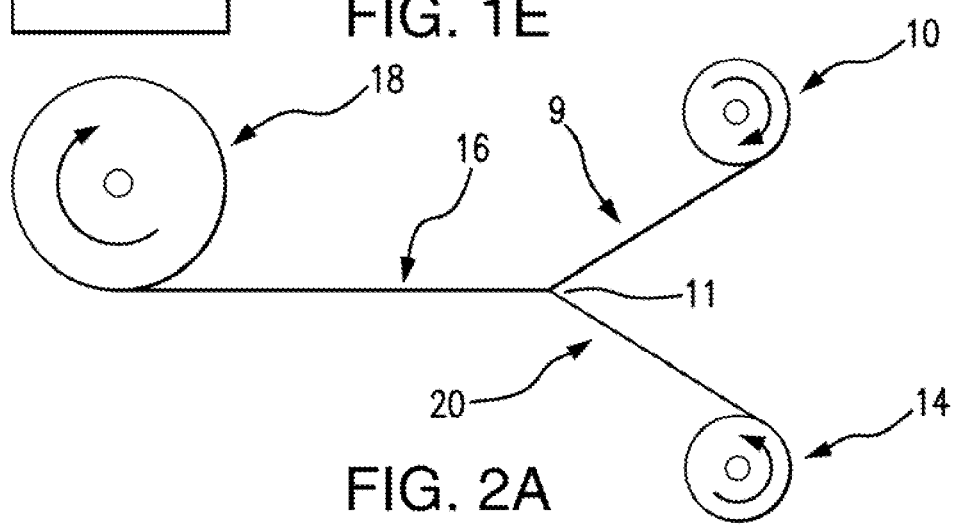
FIG. 2A is a schematic side view representation of a process wherein an oriented thermoplastic composite sheet is mated with a carrier sheet material.
Figure 4A:
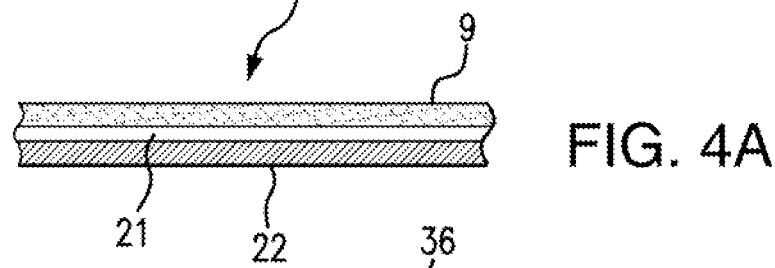
FIG. 4A is a sectional view of an oriented master sheet material formed in FIG. 2A.

However formed, the oriented thermoplastic composite sheet is then mated with a carrier sheet material to form the oriented master sheet material. In following, FIG. 2A shows a process in which the master roll 10 of a thermoplastic composite sheet 9 comprising a single oriented thermoplastic composite sheet or a plurality of thermoplastic composite sheets, at least one of which is an oriented thermoplastic composite sheet, which have been fused, spot welded or tack welded to one another, is mated with a carrier sheet material 20, also supplied off a master roll 14. The so formed oriented master sheet material 16 is then wound into a master roll 18 for subsequent processing. As seen in FIG. 4A, the oriented master sheet material comprises the thermoplastic composite sheet 9 bonded to the carrier sheet 22 by adhesive 21. Where the thermoplastic composite sheet 9 is a multilayered sheet material it preferably comprises 2 to 4 layers, at least one of which is an oriented thermoplastic composite sheet. For example, a non-oriented thermoplastic composite sheet may be mated with a single oriented thermoplastic composite sheet or it may be sandwiched between two oriented thermoplastic composite sheets. Alternatively, the multilayered thermoplastic composite sheet may have two oriented thermoplastic composite sheets where the orientation of the fibers in one sheet are crossed with respect to those of the other or the sheets may be staggered so that the splice lines of each sheet do not overlay each other or are spaced from each other.

According to a second aspect of the present teaching there is provided a method of making a master sheet material of oriented thermoplastic composite sheet said method comprising a) aligning and mating along their longitudinal axes i) a mono-layered oriented thermoplastic composite sheet material whose fibers are angled with respect to the longitudinal axis of the sheet material with ii) the mating surface of a carrier sheet material, the mating surface of the carrier sheet material having an adhesive or tacky material applied thereto, and b) either i) winding the resulting oriented sheet material on a mandrel, spool, axel, or the like to form master rolls or ii) feeding the so formed oriented master sheet material on to further processing. In the case of master rolls, the master rolls of oriented sheet material may then be transported or stored for further processing. In this iteration of the present teaching, steps (a) through (c) of the first aspect of the present teaching are bypassed and replaced with a preformed roll of an oriented thermoplastic composite sheet. In all other respects, the first and second aspects are the same, using the same materials. As with the first aspect of the present teaching, in an alternate iteration of this process, an additional step may be incorporated therein wherein at least one additional thermoplastic composite sheet material is mated and fused, tack welded or spot welded along their longitudinal axes to the oriented thermoplastic composite sheet prior to or subsequent to the mating thereof with the carrier sheet material. Alternatively, the preformed oriented thermoplastic composite sheet may be a multi-layered composite sheet having at least one layer of an oriented thermoplastic composite sheet. In both instances, it is especially preferred that the oriented thermoplastic composite sheet layer be directly mated and adhered to the carrier sheet material.

This second aspect is shown in FIG. 2A wherein a master roll 10 of thermoplastic composite sheet 9 comprising a single oriented thermoplastic composite sheet or a plurality of thermoplastic composite sheets, at least one of which is an oriented thermoplastic composite sheet, which have been fused, spot welded or tack welded to one another, is mated 11 with a carrier sheet material 20 coming from master roll 14. The so formed oriented master sheet material 16 is then wound to form a master roll 13 of oriented master sheet material for further processing.

According to a third aspect of the present teaching there is provided a method of making a master sheet material of thermoplastic composite sheet which method comprises a) aligning and mating along their longitudinal axes i) two thermoplastic composite sheets and ii) a carrier sheet material whereby the carrier sheet material is intermediate or sandwiched between the two thermoplastic composite sheets, the carrier sheet material having an adhesive or tacky material applied to both surfaces thereof and b) either i) winding the resulting oriented sheet material on a mandrel, spool, axel, or the like to form a master roll or ii) feeding the so formed oriented master sheet material on to further processing. In the case of master rolls, the master rolls may then be transported or stored for further processing. In this iteration the thermoplastic composite sheet materials may both be mono-layered or multi-layered thermoplastic composite sheets or one of the thermoplastic composite sheets may be mono-layered and the other multi-layered. Most preferably, at least one, preferably both, of the two thermoplastic composite sheets is or includes an oriented thermoplastic composite sheet wherein the fibers are angled with respect to the longitudinal axis of the sheet; though one or both may also be a conventional thermoplastic composite sheet material.

Figure 2B:
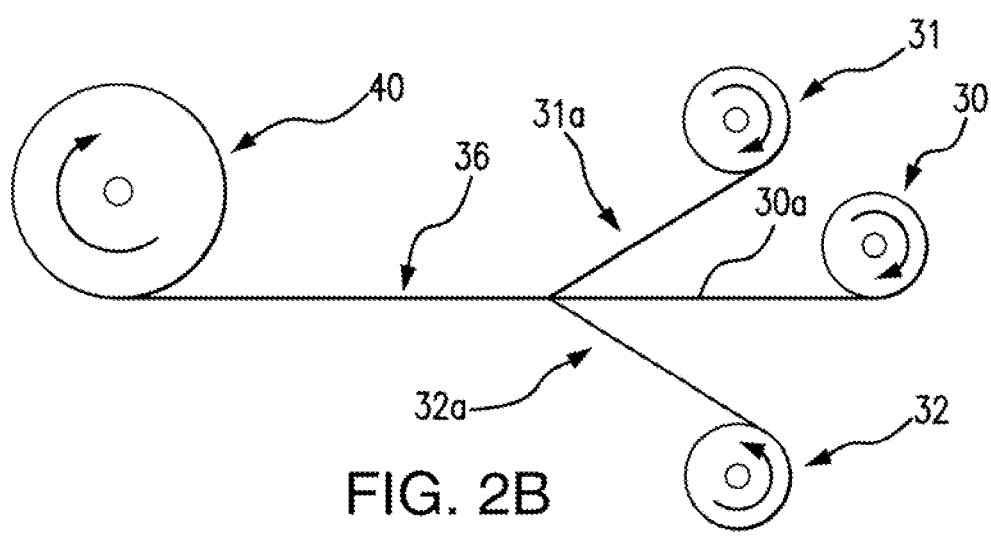
FIG. 2B is a schematic side view representation of a process wherein two thermoplastic composite sheets are mated with a carrier sheet material.
Figure 4B:
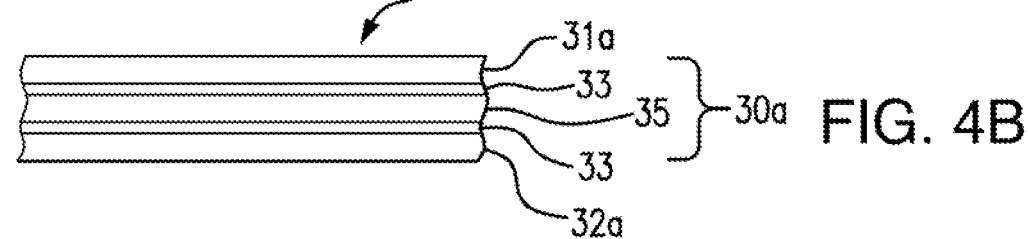
FIG. 4B is a sectional view of the master sheet material formed in FIG. 2B.

One iteration of this third aspects is depicted in FIG. 2B, wherein a master roll 30 of a carrier sheet material 30a is bonded to two thermoplastic composite sheets 31a,32a originating from master rolls 31,32 of each. Preferably at least one, most preferably both, of the thermoplastic composite sheets 31a, 32a, is an oriented thermoplastic composite sheet. The resultant master sheet material 36 is then wound to form master roll 40. As shown in FIG. 4B, the so formed master sheet material 36 comprises the carrier sheet material 30a which itself comprises the polymer film 35 having an adhesive 33 on each surface thereof sandwiched between the two thermoplastic composite sheets 31a,32a.

In each of the first, second and third aspects, concurrent with or subsequent to the mating of the carrier sheet material with the thermoplastic composite sheet(s), the layered materials may be subjected to a press or press rollers to ensure good contact, preferably full surface contact, between the mating surface(s) of the carrier sheet and the thermoplastic composite sheet(s). Additionally, if the adhesive is a tack adhesive, the process and apparatus would include a plurality of rollers and a winding spool or spindle to take up the release liner as it is removed from the carrier sheet material before mating with the thermoplastic composite tape. In the case of an activated adhesive, the process and apparatus would include the necessary apparatus between the master roll 14 of the carrier sheet material and the mating point 11 to activate the adhesive. For example, if the adhesive is heat activated or becomes tacky when heated, there would be a heater element intermediate the master roll 14 and the mating point 11.

In accordance with a fourth aspect of the present teaching there is provided a method of forming continuous sheets, strips, or tapes of thermoplastic composite materials, said method comprising feeding a master sheet material, especially those formed in accordance with any of the first, second and third aspects of the present teachings, most especially an oriented master sheet material, through a slitting apparatus having one or more knives, blades or cutters and whose knives, blades or cutters are configured to slit the thermoplastic composite sheet material into sheets, strips and/or tapes of predetermined widths. The feed of master sheet material may be from master rolls of the master sheet material or from a direct feed from the process in which the master sheet material is formed: thereby eliminating the need for winding of the master sheet material. The so formed sheets, strips or tapes may then be rolled on a spool, axel, reel, spindle or the like or passed on to further processing, including directly to part manufacture. As noted, preferably, the thermoplastic composite sheet materials used in this process are or have a mono-layer oriented thermoplastic composite sheet in which the fibers are other than parallel to the longitudinal axis of the thermoplastic composite sheet material being slit. Additionally, one may remove the carrier after slitting and before winding if desired; though, if the master sheet material includes a carrier material sandwiched between two thermoplastic composite sheet materials, each of the tows of the slit materials would then be wound around a separate spool, spindle or like element. Of course, it is also possible that the two tows may be separately wound, one with the carrier and the other without the carrier.

Figure 7:
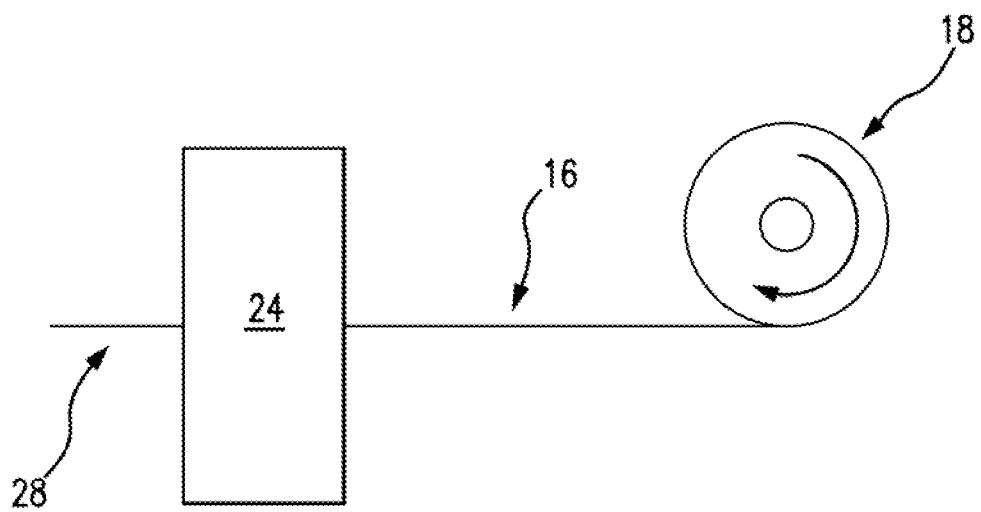
FIG. 7 is a schematic side view of the process of slitting the oriented sheet material into narrower strips, and tapes.

FIG. 7 depicts that process wherein the feed of master sheet material is from a master roll. Specifically, as shown, the master roll of oriented sheet material 18 is unwound and the unwound master sheet material 16 passed through a slitter 24 to slit the master sheet material into a plurality of narrower sheets, strips or tapes 28. Suitable slitters are well known in the composite art as they are currently used in slitting thermosetting prepreg materials into slit tape. Here the same slitters may be repurposed for slitting the master sheet materials of the herein described thermoplastic composite sheet materials. Generally speaking the slitter comprises one or more, preferably three or more, most preferably a large plurality, fifty or more, of knives, blades or cutters which are configured to slit the thermoplastic composite sheet material into sheets, strips and/or tapes of predetermined widths, which may all be the same width. Preferably, the slitter will have at least three knives, blades or cutters in order to address the issue with jagged edges that may arise in the production of the oriented thermoplastic composite sheet: here the two outermost blades, knives or cutters are used to remove a narrow edge strip which is then discarded. Most preferably, the slitter will have as many knives as needed to cut the maximum number of desired widths of thermoplastic composite sheets, strips and/or tapes from the master sheet material based on the width of the same. The so formed sheets, strips or tapes of oriented sheet material may then be rolled on a spool, axel, reel, spindle or the like for storage and/or transport or passed on to further processing, including directly to part manufacture.

Figure 3:
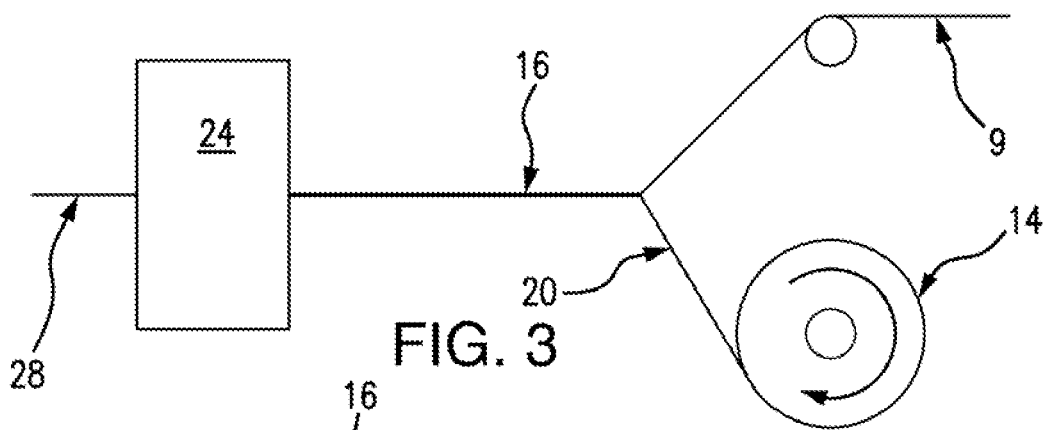
FIG. 3 is a schematic side view representation of an alternate process wherein an oriented thermoplastic composite sheet is mated with a carrier sheet material.

FIG. 3 shows an alternate process in which a thermoplastic composite sheet 9, e.g., an oriented thermoplastic sheet as formed in FIG. 1E, is mated with a carrier sheet material 20 supplied off of master roll 14 to form the master sheet material 16 and the so formed master sheet material fed directly to the slitter 24. Again, the so formed sheets, strips and/or tapes 28 of the master sheet material are then wound or sent on for further processing. Again, while suitable for use with any master sheet material, the present process and apparatus is especially suited for use with oriented master sheet material.

The process and apparatus of the fourth aspect of the present teachings may include an additional step and associated apparatus whereby the carrier sheet material is removed from the sheets, strips or tapes after slitting but before winding or further processing thereof. In the case where thermoplastic composite sheet materials are affixed to both sides of the carrier sheet material, each will be separately wound. Preferably, especially where the thermoplastic sheet material is or comprises an oriented thermoplastic sheet material, the carrier sheet material is wound with the sheets, strips and/or tapes. Although the carrier sheet material has performed its key function in ensuring integrity of the oriented sheet material, most especially the welds or fuses therein, during the slitting process, its continued presence will address any weaknesses therein during the winding and subsequent unwinding prior to integration into the final part.

Finally, FIGS. 8 and 9 are presented to provide a clearer sense and detail of an overall process and apparatus by which master rolls of master sheet material, especially oriented master sheet materials, are slit and wound. FIGS. 8 and 9 show top and side schematic views of an apparatus 51 comprising four key stations, an unwind station 53, a splicing station 54, a slitting station 55 and a winding station 56, the latter comprising a spool winding section 57 and a spindle winding section 58. Each station and section will be described in greater detail below: though absolute detail is not necessary as most all of the elements are well known and commercially available.

As shown in FIGS. 8 and 9, the unwind station 53 comprises a support structure 73 having opposing sidewalls 74 spaced from one another by a distance that will accommodate a master roll of oriented sheet material 71, end-to-end, between the side walls. Each side wall 74 includes a cradle or like structure 75 adapted to receive and allow rotation therein of an axel 72 about which the oriented sheet material 71 is wound or upon which a mandrel or core element about which the oriented sheet material is wound is mounted. Preferably, and as shown, the axel is directly or indirectly attached to or engaged with a drive motor 76 which rotates the axel 72 about its axis to facilitate the unwinding of the oriented sheet material from the master roll.

The splicing station 54 comprising splicer 54a follows the unwind station and is most often a part of or combined with the unwind station. The splicing station typically comprises heating and compression elements (not shown) to facilitate the splicing of the tail end of one master roll to the lead end of another master roll. The splicing station may, and preferably does, also incorporate cutting or slitting means or elements for cutting across the width of the oriented sheet material. The latter may be necessary to provide a clean cut to the tail end and/or leading end of a master roll, to excise a master roll for replacement with a new master roll, or to insert a blank roll, for priming the system.

When not conducting a splicing operation, the splicing station is merely a pass-through station with the structure of the splicing station doing nothing more than, perhaps, helping with the proper alignment of the oriented sheet material as it enters the slitting station 55. Specifically, those elements of the splicing station associated with the splicing operation or process itself are typically withdrawn or pulled back from the pathway of the oriented sheet material and only advanced to be in contact with the oriented sheet material therewith when a splice is to be made. Splicing techniques and their associated elements and apparatus are well known and commercially available from multiple sources.

Following the splicing station, if present, is the slitting station 55. The slitting station comprises a slitter 55a with slitting or cutting elements 55b (shown in dashed lines in FIG. 9) and, typically, a number of elements and components (not shown) for moving the oriented sheet material to, through and/or past the slitting and cutting elements. All of the components of the slitting station are well known and commercially available. In this particular embodiment, the slitting and cutting elements are configured to slit the oriented sheet material into a plurality of slit tape tows of at least two distinct widths, one of which is wide enough that the winding thereof may be attained on a spool or reel winder and the other of which is of such narrow width that it is to be wound on a spindle type spool winder: the former laying successive layers directly over one another and the latter providing for a traverse winding. However, it is to be appreciated that similar slitting apparatus can be employed with only slit narrow tapes or only wide tapes. Suitable slitting elements are well known in the art and include precision, high strength blades, cool lasers, micro-knives, and the like.

Strips and tapes of the oriented sheet material made upon this apparatus is capable of use in aircraft production where tolerances in terms of variation in the widths of the slit strips and tapes over their specifications are extremely low, on the order of hundredths of an inch, preferably thousands of an inch, perhaps 3 or 5 thousands of an inch (0.003"(0.076 mm) 0.005" (0.127 mm), respectively).

The final station of the apparatus of FIGS. 8 and 9 is the winding station 56. This station comprises two distinct sections, the spool winding section 57 for the wide sheets or strips 78 of oriented sheet material and the spindle winding section 58 for the narrow strips or tapes 79 of oriented sheet material. The spool winding section 57 comprises a support structure 83 having opposing sidewalls 84 spaced from one another by a distance that will accommodate an axel 82 having or capable of having a plurality of spools 80 situated thereon. The axel is attached, directly or indirectly, to, a drive motor 76 which rotates the axel about its axis to allow the spools to take up the wide sheets or strips of oriented sheet material.

The second section of the winding station 56 is the spindle winding section 58 comprising a plurality of spindle winders 60 mounted on a support structure 63 for winding the narrow strips or tapes 79 of oriented sheet material. Each spindle winder comprises a spindle axel 62 which is, directly or indirectly, attached to or engaged with a drive motor 64 for rotating the axels about their axes. Each motor may be associated with one or more axels; but are, in any event, coordinated to run simultaneously, though not necessarily at the same speed. Specifically, unless the spindles are changed out and wound at the same time, the rate of winding of each spindle axel must be independent so as to allow for different rates of rotation based on the amount of material already wound on the spindle. Typically, and preferably, each spindle winder has its own drive motor as shown in FIG. 9.

Like the spool axel motor 76, the spindle axel drive motors 64 associated with the spindle winders are preferably passive, meaning they maintain a modest tension on the material being wound but are not actually pulling the material through the apparatus. Rather, the system will further comprise a plurality of drive rollers that also assist with the pull-through and movement of the slit material through the apparatus from the slitter to the winders. Again, as mentioned, the overall speed of the system is generally dictated by the speed of the oriented sheet material passing through the slitting station.

Although not shown, those skilled in the art will readily appreciate that the apparatus of the slitting and winding stations will also comprise a number of roller and guide elements to facilitate the passage of the oriented sheet materials through the slitter, which facilitation includes speed of passage, alignment of the sheet vis-à-vis the blades or cutting elements, and the stabilization/positioning of the slit material while being wound as well as the positioning of the slit material for proper traverse winding.

The present teachings provide a number of benefits over the state of the art. Specifically, the presence of the carrier sheet provides additional integrity and strength to the tow of the oriented thermoplastic composite sheet material thereby markedly decreasing, if not eliminating, the concern for the failure of weld seams in oriented thermoplastic composite sheets, particularly in high speed traversing, winding and/or slitting. The presence of the carrier sheet improves process integrity and performance, especially as evidenced by increased throughput and higher speed processing or traversing. Most especially, the presence of the carrier sheet enhances slitting by further eliminating the stress of the slitting operation on the seam and, in particular, the uneven stress of slitting at the seam due to the angle of the seam. In this respect, it is to be appreciated that because the alignment of the plurality of slitters is perpendicular to the tow and the seam is angled, each slitter element engages the seam at a different time than the others; thus, adding a point of high stress when the slitter engages the seam. Of course the stresses are multiplied in a multi-layered master sheet material having two or more layers of oriented thermoplastic composite sheet. Furthermore, in those slitting processes wherein the master sheet materials have a thermoplastic composite sheet material on each surface of the carrier material one is able to double the production or, more importantly, slit two different materials at the same time, Altogether, the present teachings provide for faster, more efficient and more cost effective production of thermoplastic composite master sheet materials, particularly, oriented thermoplastic composite master sheet materials, and slit sheets, strips and tapes of the foregoing.

Although the method and apparatus of the present specification have been described with respect to specific embodiments and figures, it should be appreciated that the present teachings are not limited thereto and other embodiments utilizing the concepts expressed herein are intended and contemplated without departing from the scope of the present teaching. Thus true scope of the present teachings is defined by the claimed elements and any and all modifications, variations, or equivalents that fall within the spirit and scope of the underlying principles set forth herein.

We claim:

1. A continuous thermoplastic composite tape or strip of predetermined width formed by slitting to said predetermined width a continuous thermoplastic composite master sheet material of at least 10 meters in length comprising i) a thermoplastic composite component comprising at least one oriented thermoplastic composite sheet, said oriented thermoplastic composite sheet formed by cutting a conventional thermoplastic composite sheet at a non-zero angle relative to the longitudinal axis of the conventional thermoplastic composite sheet to form cut segments having cut ends and side edges, aligning the segments side edge-to-side edge with a slight overlap and fusing or welding the overlap to form a continuous oriented thermoplastic composite sheet and ii) a continuous carrier sheet, said carrier sheet having at least one mating surface with an adhesive or tacky material applied thereto to which the continuous oriented thermoplastic composite sheet is aligned and mated along its longitudinal axis, said carrier sheet being a polymer film, paper or a cellulosic sheet material and configured to be removable from the thermoplastic composite component, said conventional thermoplastic composite sheet comprising a thermoplastic polymer sheet having incorporated therein a plurality of unidirectional fibers extending along the length of the sheet.

2. The continuous thermoplastic composite tape or strip of claim 1 wherein the angle of the fibers in the continuous oriented thermoplastic composite sheet are 30°, 45°, 60°, 90°, −60°, −45° or −30° relative to the longitudinal axis of the continuous oriented thermoplastic composite sheet.

3. The continuous thermoplastic composite tape or strip of claim 1 wherein the tape or strip has a length of at least 25 meters.

4. The continuous thermoplastic composite tape or strip of claim 1 wherein the tape or strip has a width of from about 0.5 centimeters to about 5.08 centimeters.

5. The continuous thermoplastic composite tape or strip of claim 1 wherein the carrier has been removed following slitting.

6. The continuous thermoplastic composite tape or strip of claim 1 wherein the thermoplastic composite component is a multi-layered thermoplastic composite sheet material, at least one layer of which is the continuous oriented thermoplastic composite sheet.

7. The continuous thermoplastic composite tape or strip of claim 6 wherein the multi-layered thermoplastic composite sheet material includes a conventional thermoplastic composite sheet material, a second oriented thermoplastic composite sheet, a composite sheet comprising a polymer matrix and chopped fibers dispersed therein, or a combination of any two or all three of the foregoing.

8. The continuous thermoplastic composite tape or strip of claim 1 wherein the master sheet material comprises two thermoplastic composite components, at least one of which is or includes the continuous oriented thermoplastic composite sheet, and the continuous carrier sheet has two mating surfaces, each with the adhesive or tacky material applied thereto, with the carrier material sandwiched between the two continuous composite sheets.

9. The continuous thermoplastic composite tape or strip of claim 8 wherein at least one of the two thermoplastic composite components is a multi-layered thermoplastic composite sheet material, at least one layer of which is the continuous oriented thermoplastic composite sheet.

10. The continuous thermoplastic composite tape or strip of claim 9 wherein the multi-layered thermoplastic composite sheet material includes a conventional thermoplastic composite sheet material, a second oriented thermoplastic composite sheet, a composite sheet comprising a polymer matrix and chopped fibers dispersed therein, or a combination of any two or all three of the foregoing.

11. A method of forming continuous strips or tapes of at least 10 meters in length and of predetermined widths of an oriented thermoplastic composite sheet material, said method comprising feeding an oriented master sheet material of at least 10 meters in length through a slitting apparatus having one or more knives, blades or cutters which knives, blades or cutters are configured to slit the oriented master sheet material into strips and/or tapes of predetermined widths wherein the oriented master sheet material comprises a thermoplastic composite component comprising at least one oriented thermoplastic composite sheet, said oriented thermoplastic composite sheet formed by cutting a conventional thermoplastic composite sheet at a non-zero angle relative to the longitudinal axis of the conventional thermoplastic composite sheet to form cut segments having cut ends and side edges, aligning the segments side edge-to-side edge with a slight overlap and fusing or welding the overlap to form a continuous oriented thermoplastic composite sheet and ii) a continuous carrier sheet, said carrier sheet having at least one mating surface with an adhesive or tacky material applied thereto to which the continuous oriented thermoplastic composite sheet is aligned and mated along its longitudinal axis, said carrier sheet being a polymer film, paper or a cellulosic sheet material and configured to be removable from the thermoplastic composite component, said conventional thermoplastic composite sheet comprising a thermoplastic polymer sheet having incorporated therein a plurality of unidirectional fibers extending along the length of the sheet.

12. The method of claim 11 wherein the angle of the fibers in the continuous oriented thermoplastic composite sheet are 30°, 45°, 60°, 90°, −60°, −45° or −30° relative to the longitudinal axis of the continuous oriented thermoplastic composite sheet.

13. The method of claim 11 wherein the tape or strip has a length of at least 25 meters.

14. The method of claim 11 wherein the tape or strip are cut into widths of from about 0.5 centimeters to about 5.08 centimeters.

15. The method of claim 11 wherein the carrier is removed following slitting wherein the thermoplastic composite component is a multi-layered thermoplastic composite sheet material, at least one layer of which is the continuous oriented thermoplastic composite sheet.

16. The method of claim 15 wherein the multi-layered thermoplastic composite sheet material includes a conventional thermoplastic composite sheet material, a second oriented thermoplastic composite sheet, a composite sheet comprising a polymer matrix and chopped fibers dispersed therein, or a combination of any two or all three of the foregoing.

17. The method of claim 11 wherein the master sheet material comprises two thermoplastic composite components, at least one of which is or includes the continuous oriented thermoplastic composite sheet, and the continuous carrier sheet has two mating surfaces, each with the adhesive or tacky material applied thereto, with the carrier material sandwiched between the two continuous composite sheets.

18. The method of claim 17 wherein at least one of the two thermoplastic composite components is a multi-layered thermoplastic composite sheet material, at least one layer of which is the continuous oriented thermoplastic composite sheet.

19. The method of claim 18 wherein the multi-layered thermoplastic composite sheet material includes a conventional thermoplastic composite sheet material, a second oriented thermoplastic composite sheet, a composite sheet comprising a polymer matrix and chopped fibers dispersed therein, or a combination of any two or all three of the foregoing.

20. The method of claim 11 further comprising the step of splicing one oriented master sheet material to another as the end of the first approaches the slitting apparatus so that continuous strips and tapes of at least 25 meters in length can be produced.

\* \* \* \* \*